United States Patent
Keller et al.

(10) Patent No.: US 7,664,354 B2
(45) Date of Patent: Feb. 16, 2010

(54) SYSTEM AND METHOD FOR LOOSE TUBE TIGHT BUFFER INDOOR/OUTDOOR OPTICAL FIBER CABLE

(75) Inventors: David Keller, Cary, NC (US); Bernard Michael Blell, Raleigh, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/600,932

(22) Filed: Nov. 16, 2006

(65) Prior Publication Data

US 2008/0031580 A1 Feb. 7, 2008

Related U.S. Application Data

(60) Provisional application No. 60/834,859, filed on Aug. 1, 2006.

(51) Int. Cl.
*G02B 6/44* (2006.01)
(52) U.S. Cl. ...................................... 385/109
(58) Field of Classification Search ............... None
See application file for complete search history.

(56) References Cited

U.S. PATENT DOCUMENTS

| 4,787,702 | A | 11/1988 | Khalil | 350/96.23 |
|---|---|---|---|---|
| 5,373,100 | A | 12/1994 | Arroyo et al. | 174/23 R |
| 5,627,932 | A | 5/1997 | Kiel et al. | 385/102 |
| 5,917,977 | A | 6/1999 | Barrett | 385/101 |
| 6,049,647 | A | 4/2000 | Register et al. | 385/101 |
| 6,178,278 | B1 | 1/2001 | Keller et al. | 385/109 |
| 6,586,094 | B1 | 7/2003 | Rebouillat et al. | 428/372 |
| 6,876,799 | B2 * | 4/2005 | Rossi et al. | 385/109 |
| 2002/0044711 | A1 * | 4/2002 | Kim et al. | 385/11 |
| 2006/0165355 | A1 * | 7/2006 | Greenwood et al. | 385/100 |

FOREIGN PATENT DOCUMENTS

| DE | 4410766 | 10/1995 |
|---|---|---|
| EP | 0510255 | 11/1991 |
| EP | 1004914 | 11/1998 |
| EP | 1016887 | 12/1999 |
| EP | 1710607 | 4/2006 |

OTHER PUBLICATIONS

Structure MOV-40-xByy- Mar. 29, 1996 Cable for Indoor and Outdoor Use.
European Search Report- Oct. 30, 2007.

* cited by examiner

*Primary Examiner*—Sung H Pak
(74) *Attorney, Agent, or Firm*—Sofer & Haroun, LLP (57) ABSTRACT

A fiber cable having at least one fiber optic element, a water swellable powder, disposed on the fiber optic element and a tube surrounding the fiber element and the water swellable powder. The fiber optic element is in a loose non-coupled arrangement with respect to the inside of the tube such that during installation, mechanical installation stresses applied to the cable and the tube are not imparted to the fiber optic element therein.

16 Claims, 9 Drawing Sheets

SYSTEM AND METHOD FOR LOOSE TUBE TIGHT BUFFER INDOOR/OUTDOOR OPTICAL FIBER CABLE

RELATED APPLICATION

This application is related to and claims the benefit of priority from U.S. Provisional Patent Application No. 60/834,859, filed on Aug. 1, 2006, the entirety of which is incorporated herein by reference.

FIELD OF THE INVENTION

The present invention is related to fiber optic cables. More particularly, the present invention relates to tight buffer optical fibers in a loose tube fiber cable arrangement.

BACKGROUND

In the scenario of installing fiber optic cable in dense cable situations, such as in dwelling/housing units, customers typically look for an indoor/outdoor fiber cable that can be used for both aerial drop (from pole to house) or buried/ditch (underground to house) and then can be pulled or pushed through the dense cable situation inside, without being easily attenuated from the rough handling associated with pulling or tugging the cable through the conduits.

Prior art arrangements utilize strengthened loose tube fiber arrangements either using a gel filled tube or a stranded aramid wrapped 4, 6 or 12 fiber assembly. In this case, loose tube refers to the fact that the fibers are arranged loosely within a larger outer sheath or jacket. The fibers can either be basic optical fibers (having only the standard 250 micro UV coating) or "tight buffer" optical fibers (having an additional polymer coating totaling 900 microns over the basic UV coating).

There are many drawbacks associated with the prior art arrangements. First, there are many physical problems with the combination of gel and strength members used in prior art fiber optical cables.

Figure 1:
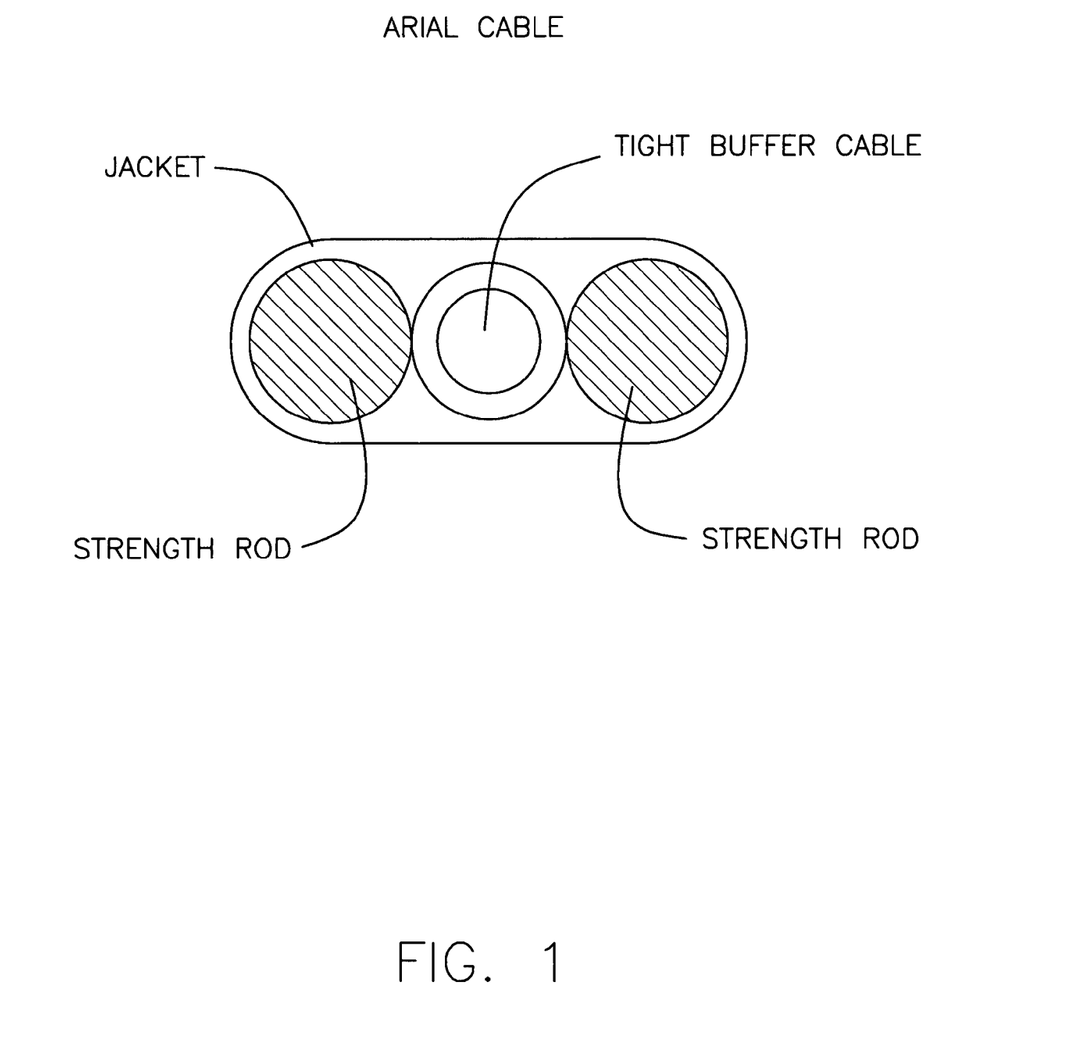
FIG. 1 illustrates a prior art cable.

For example, FIG. 1 shows an aerial drop cable having two strength rods, one on either side of the tight buffer optical fiber and a gel for protecting the fibers. The stiff rods are prone to moisture breakdown and fracture, resulting in potential breakage in tight diameter coiling (eg. 6" diameter). Multiple bends of such cable can also result in pinching or compressing of the central fiber. Cables of this design are ill suited for multiple 90 degree, small diameter, bends in excess of two before GRP (Glass Reinforced Plastic) fracture and then resulting in significant attenuation in the fibers.

Furthermore, the wide flat construction, although acceptable for the aerial drop from the pole to the house or use in ditch leading up to the house, makes it more difficult to navigate through conduits within the apartment building or the house that are tightly packed with other utility cables. Aerial drop cables tend to be too-flexible to be forced through the building conduit and cables using more rigid strength members suffer from the opposite drawback, namely being too sturdy to easily navigate dense conduits. The typical side by side addition of a tone wire (used for detection of buried or hidden cable) in a flat drop cable may also add additional bulk which further interferes with movement through the conduits through the dwelling unit.

Another drawback associated with the prior art is that the semi-coupling of the fibers to the cable jacket by virtue of the gel or stranding (yarn friction with the inside diameter of the jacket) also acts to lock in fiber strain when the cable is installed. Fiber strain is a result of the installation process, where the pulling of the cable also imparts similar stresses to the optical fibers therein.

The gel used in these cables acts to hold the strain in the fibers long after installation. This fiber strain takes time to adjust, over months or even years, so that the fibers can relax relative to the cable jacket. This strain relief or fiber migration may easily result in a slow pulling from the ends of the fiber from their connection points.

Figure 2:
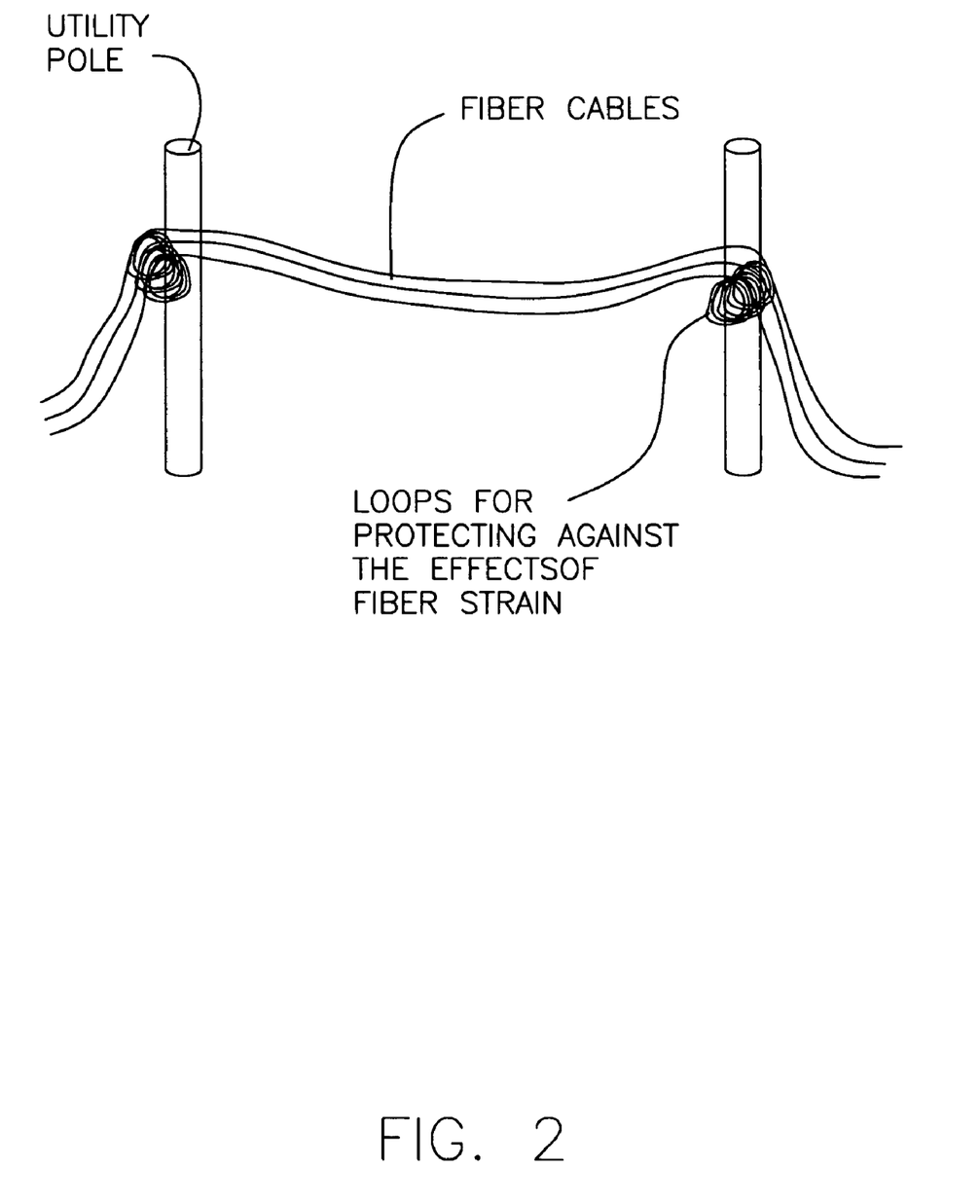
FIG. 2 illustrates a prior art cable on a pole.

As shown in FIG. 2, an installer may typically use loops on the poles to prevent fiber migration within the cables caused by the fiber strain imparted during installation. However, the loops themselves also work to maintain additional unwanted tension in the fibers. This arrangement requires additional cable strength to compensate for the added locked in fiber strain, adding cost and weight to the product, not to mention the use of extra cable adding cost and cluttering the cables on the pole. Further, these lock-in-loops set up a high bending stress scenario for the grp (glass reinforced polymer) rods in the flat drop cable which, when these grp rods are exposed to humidity migration through the jacket over time, begin to loose their integrity and begin to fracture from this coil stress. This results in cable failure and fiber attenuation or breakage.

Yet another drawback associated with the prior art arrangement is that although the gel is good for protecting the optical fibers within the cable during tough installation conditions, the gel used is typically an oil based gel which is flammable. Although a silicone gel is available, it is prohibitively expensive.

OBJECTS AND SUMMARY

The present invention looks to overcome the drawbacks associated with the prior art and provide a loose tube optical fiber cable that is loose, relative to the outer jacket so that there is little or no installation tension or fiber strain imparted to the fibers during installation and twisting, eliminating the need for coiling to prevent migration from relaxing fiber strain by allowing for free rotational movement of the fibers inside the loose tube during installation.

It is another object of the present invention, to provide an adequately protected fiber cable arrangement without using gel or stranding of the fibers.

It is another object of the present invention to provide tight buffer optical fibers within a specified area fill ratio within the jacket so that the maximum flexibility is imparted to the fibers so as to avoid installation stresses while simultaneously maintaining the required protection for the fibers.

To this end, the present invention is directed to a fiber cable having at least one fiber optic element, a water swellable powder, disposed on the fiber optic element and a tube surrounding the fiber element and the water swellable powder. The fiber optic element is in a loose non-coupled arrangement with respect to the inside of the tube such that during installation, mechanical installation stresses applied to the cable and the tube are not imparted to the fiber optic element therein.

BRIEF DESCRIPTION OF THE DRAWINGS

The present invention can be best understood through the following description and accompanying drawings, wherein.

DETAILED DESCRIPTION

Figure 3:
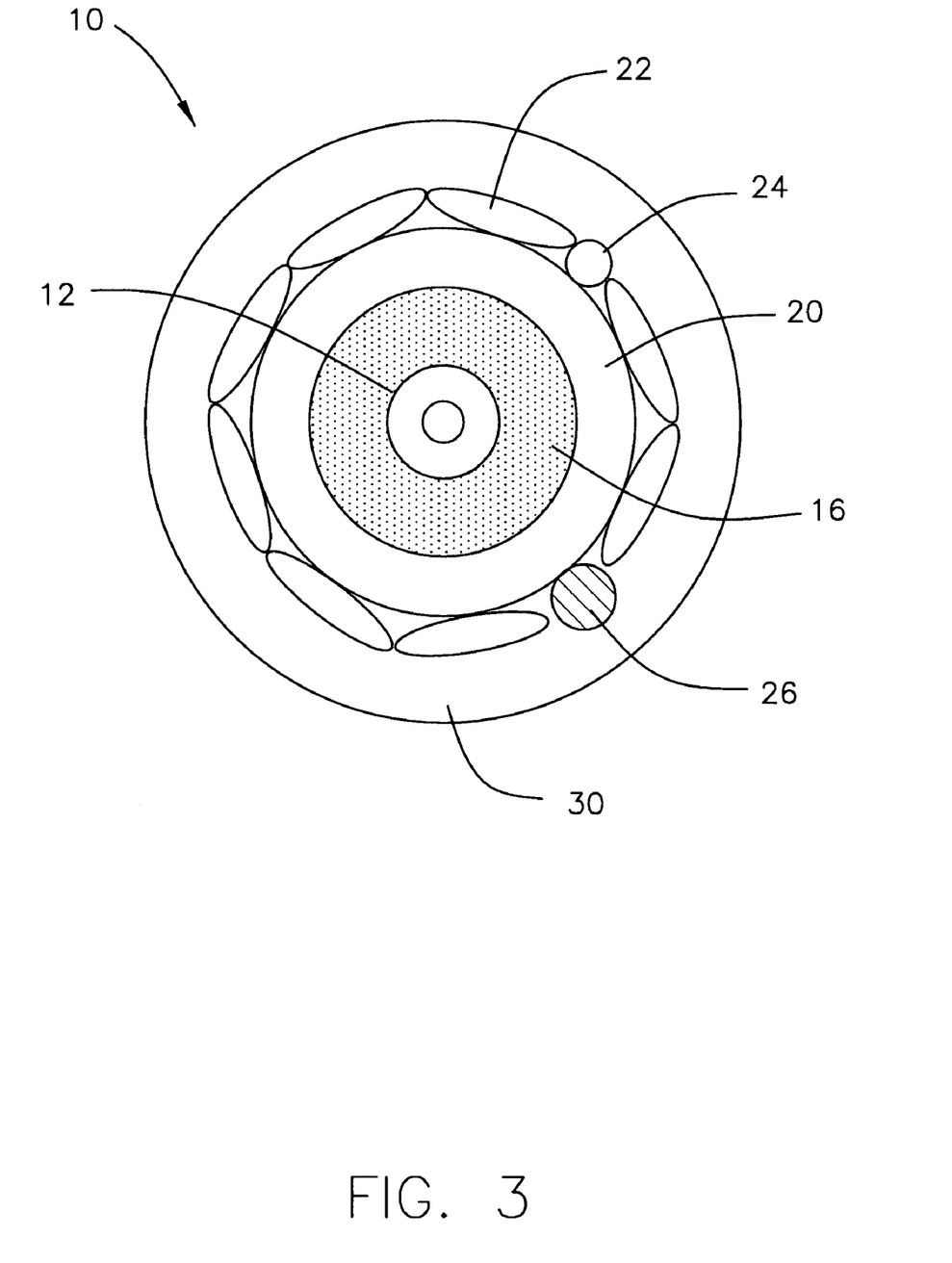
FIG. 3 illustrates a sample single fiber cable, in accordance with one embodiment of the present invention.

In one embodiment of the present invention as illustrated in FIG. 3, a loose tube fiber optic cable 10 is provided. Cable 10 maintains a first tight buffer optical fiber 12, surrounded a by a water swellable powder 16. Tight buffer optical fiber 12 is preferably a typical tight buffer fiber having a UV coated fiber core surrounded by a polymer layer totaling approximately 900 microns in diameter. Although the typical employment of cable 10 uses tight buffer fibers 12, the invention may also be equally applicable to non-tight buffer 0.250 micron fibers as well. Water swellable powder 16 is preferably a SAP (Super Absorbing Polymer) such as CABLOC™, however the invention is not limited in this respect.

Figure 4:
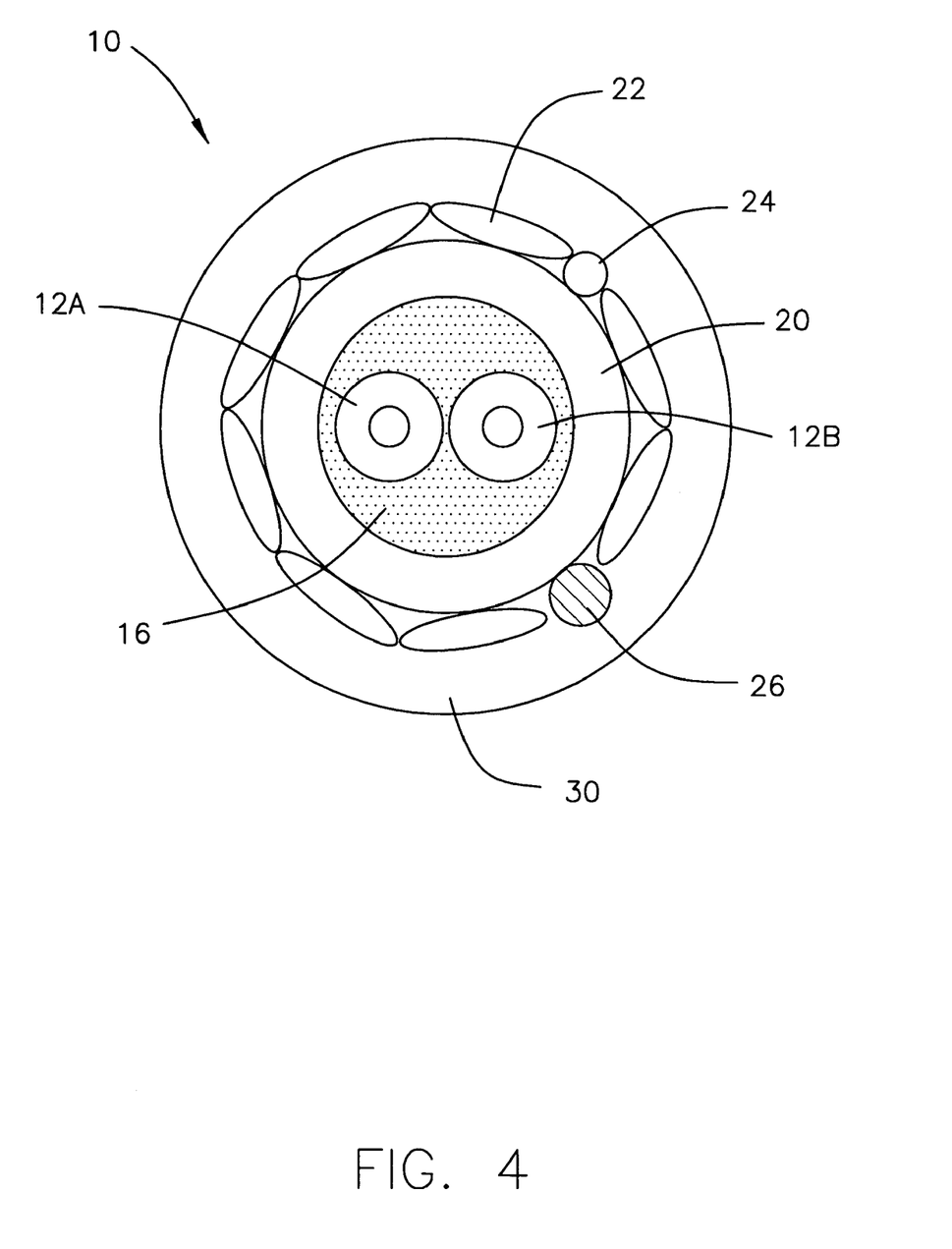
FIG. 4 illustrates a sample two fiber cable, in accordance with one embodiment of the present invention.

In another preferred embodiment, as illustrated in FIG. 4, two tight buffer optical fibers 12a and 12b are shown, again surrounded by water swellable powder 16. For the purposes of illustration, the two fiber arrangement of FIG. 4 will be used to discuss the salient features of the present invention. However, all features discussed herein are equally applicable in both arrangements.

In both arrangements, water swellable powder 16 may act as both a moisture absorption element in the case of a breach of cable 10 to protect fiber 12, as well as a lubricant to allow smooth unimpeded longitudinal movement between fiber 12 and the inside diameter of loose tube 20 as discussed in more detail below. Powder 16 is applied to tight buffers 12 as they enter tube 20, but powder 16 may be allowed to shake off and typically resides in a predictable balance of powder 16 to surface area on the interior of tube 20 and the outer surface(s) of tight buffers 12. In one embodiment of the present invention the inside of tube 20 preferably maintains a scattering of powder 16 particles approximately 50 to 150 microns apart on the interior of tube 20. Ideally, when removing tube 20 for access to tight buffers 20, very little powder 16 is exposed as the majority of it stays within the inside surface of tube 20, adhering to its large surface area. An exemplary quantity of powder 16 is such that wiping off about three feet of tight buffers 12 results in approximately 0.25-1.5 mm$^3$ of powder 16.

Surrounding optical fibers 12a and 12b is a loose tube 20, preferably having an inner diameter of 2 mm, and an outer diameter of 3 mm. Loose tube 20 is preferably constructed of a low modulus FRPVC (Fire Resistant Poly Vinyl Chloride) however the invention is not limited in this respect. Low modulus polymer in this instance refers to a polymer having a Young's modulus substantially in the range of 250-750 N/mm$^2$. Any suitable polymer may be used provided it meets the necessary fire safety and constructions standards. As noted above the term "loose tube" refers to the loose nature of the loose tube 20 with relation to the tight buffer fibers 12 contained therein.

Disposed around the outer diameter of loose tube 20, a plurality of water swellable strength yarns 22 are arranged to provide tensile strength to cable 10 as well as added water resistance. In one embodiment of the present invention, an exemplary material for yarns 22 are Neptco 785 G™, a water swellable-coated fiberglass yarn 22 originally developed by Owens Corning® as OC 785 G™ and then sold to Neptco®, who is the current distributor.

Preferably, yarn 22 is fed into tube 20 straight, ultimately making a 1:1 engagement of strength yarns 22 to cable strain under pulling tensile, minimizing the helical engagement lag of the stranded aramid yarns used in a typical premises application. The small yarns 22 also avoid the rigid inflexibility as found in the grp used in the flat drop cable 10.

As shown in the figures typical arrangements of the present invention employ six to eight yarns 22, but the invention is not limited in that respect. Any number of yarns needed to meet the requirements of weight, flexibility and strength may be substituted as necessary.

The use of flexible strength yarns to impart longitudinal tensile strength to cable 10 to protect fibers 12 are advantageous over the use of more rigid strength rods employed in the prior art as discussed in more detail below.

A metal wire such as a 24 gauge (American Wire Gauge) may be employed in yarns 22 to make sure that the compact round shape of cable 10, as shown in FIGS. 3 and 4, is maintained.

A ripcord 24 may be optionally added for easily removing the outer jacket. A tone conductor 26 may be optionally added for locating cable 10 in buried applications to avoid cutting cable 10 in later excavations, and could also be used in any other manner that one could expect from a 26 AWG tined, coated copper stranded conductor, or any suitable conductor.

Surrounding the yarns 22, ripcord 24 and tone conductor 26, arranged around the outside diameter of loose tube 20, an outer jacket 30 is disposed over the top as an additional protection for cable 10 (water resistance and crush protection) and to secure the strength yarns 22 in place. Outer jacket 30 is preferably constructed of the same FRPVC as loose tube 20, however the invention is not limited in this respect.

Figure 5:
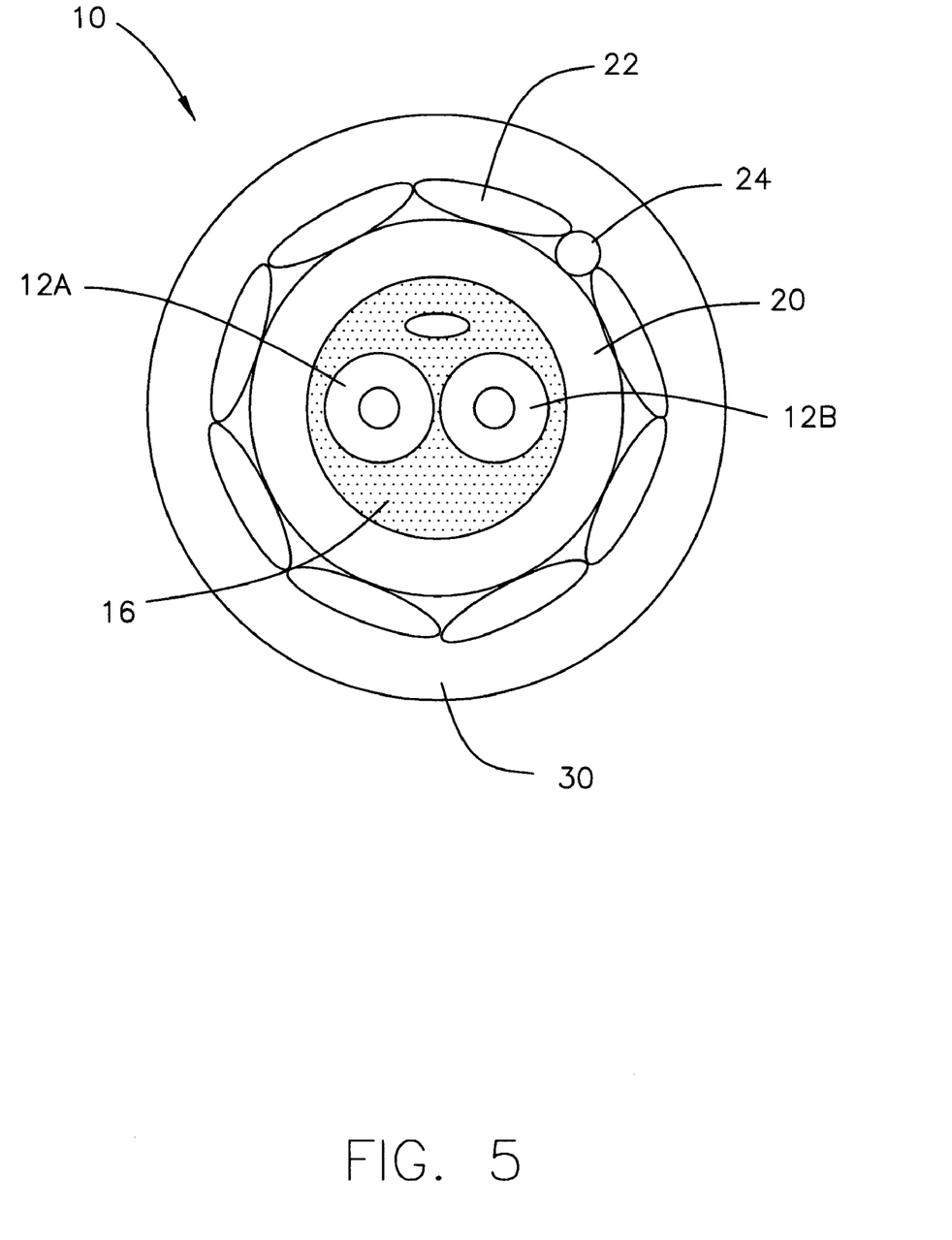
FIG. 5 illustrates a sample two fiber cable with an additional strength yarn, in accordance with another embodiment of the present invention.

In an alternative arrangement of the present invention, as illustrated in FIG. 5, an optional water swellable yarn 28 or NWS yarn (non water swellable yarn) may be used so as to allow powder 16 to be carried along with tight buffers 12 as they enter tube 20. These yarn(s) 28 may be added inside of loose tube 20 to assist in carrying more water swellable powder 16 around tight buffer fibers 12a and 12b, and also to add additional moisture protection and tensile strength.

Having discussed the structural arrangement of cable 10 above, such construction thus displays advantages over prior art cable arrangements.

In one embodiment of the present invention, as noted above, loose tube 20 maintains an inner diameter of approximately 2 mm. As shown in FIG. 4, the two fibers 12a and 12b each have a diameter of 900 microns. As such the inner diameter of tight buffer 20 is approximately 10% larger than the (+/−2%) of the total combined diameter of fibers 12a and 12b.

0.9 mm+0.9 mm=1.8 mm 1.8 mm×1.1 (10%+)=1.98 mm

Thus, according to the present arrangement, there is enough space within the interior of tube 20 so that the tight buffers 12 can slide along the length of cable 10 during installation so that they can return to a relaxed state with respect to tube 20 of cable 10, in a relatively short period of time. This is in sharp contrast to prior art cables using tightly wrapped aramid or gel filled designs where during installation, various tensions and outside forces are transmitted to the interior fibers or tight buffers. Installers attempt various mitigations to momentarily prevent this relaxation only prolonging the problems. For example, as shown in FIG. 2, locking in the fiber with loops only slowed the fiber migration to relaxation. Because of this installation strain, the wrapped aramid fibers of the prior art may provide prolonged strain on the fiber leading to a fiber break.

Thus, the arrangement of the present invention overcomes such drawbacks by allowing movement of the fibers, tight buffers 12 within the tube 20, preventing breaks caused by tube 20 elongation or compression/collapse during pushing into a conduit. Another advantage of the present design is that its minimal rigidity provides the right balance of rigidity (from yarn 22 placement and use of low modulus plastic) to allow stuffing the cable upward into conduits and yet is sufficiently flexible so as to be easily bent compared to the two extremes (rigid) of the prior art flat drop and typical (too flexible) premises cable.

Another advantage of the 10% clearance between the outer diameter of fibers 12 and inner diameter of tube 20 of the present arrangement is that it provides a safe allowance to give tight buffers 12 room to move within tube 20. This diameter variation provides some minimal contact and the compressibility of the low modulus PVC used for tube 20 minimizes the normal force on tight buffers 12 where this minimal friction prevents tight buffer fibers 12 from literally falling out of the cable while allowing differential length adjustment.

An ordinary round (non stressed) cable 10 according to the present invention, having these dimensions results in an area fill ratio of approximately 40%+/3%, allowing fibers 12a and 12b significant room to move within loose tube 20.

$$((0.9\ mm)^2 * 2)/(2\ mm)^2 = 0.405$$

This feature of the present invention is particularly useful in when there are only two constituents within tube 20, where contact with the inner wall of tube 20 is the critical element that must be minimized. Powder 16, while acting as a swelling water block also acts as a friction reducer in allowing tight buffers 12 to move within tube 20. Further, the use of tight buffers 12 with additional powder 16 coating over fibers 12 reduces fibers 12 attenuation sensitivity or glass deformation due the shape of the water swellable powder 16 particles, or "rocks," themselves.

Typical size of powder 16 particles is 0-50 microns for fibers with 0-150 micron particle outer diameters possible with tight buffers 12. In the present invention, the preferable power 16 particle size is 0-50 micron particle (outside diameter) for both tight buffer and non-tight buffer fiber applications to minimize attenuation or glass deformation of either design. Any glass deflection or deformation exceeding approximately 14 degrees will inadvertently allow light to be reflected out of the glass or light lost which is the meaning of "attenuation."

A first advantage of this arrangement is that the powder filled loose tube 20 allows for compression and improved bend movements of more than two 90 degree angle bends without inducing attenuation in fibers 12. This is further facilitated by the use of water swellable yarns 22 instead of the strength rods used in the prior art. Thus, the present invention, although capable of maintaining a compact round structure needed for balance of crowded conduit insertability and flexibility, is inherently provided with the ability to bend and compress without degrading the fibers 12.

In one embodiment of the present invention, cable 10 of the present invention preferably employs between 6-8 yarns 22, where their width is about 1.7 mm to 2.5 mm, and their thickness is about 0.15 to 0.40 mm. Thus, for selecting the amount of yarns 22 to go around tube 20 of such a diameter, the circumference of tube 20 plus yarns 22 is calculated to be of a thickness of approximately 3.5 mm (approximately) multiplied by (3.1416) PI=11 mm. Then dividing this circumference of approximately 11 mm by the minimum expected yarn width of 1.7 mm, results in roughly 6.47 yarns 22 with the resulting approximated number of side by side yarns 22 being 6-8 yarns.

In another embodiment of the present invention, the tension of yarns 22 is balanced to be within 10% of the cable drawing tensions so that there is substantially no unbalanced collection of yarns 22 around tube 20. This balanced assembly results in an improved yarn 22 to tensile and cold temperature contraction efficiency. This efficiency, or side by side positioning of glass yarns 22 provides an approximate 300 lb tension ratio at 0.5%-0.6% cable strain as compared to the typical 50-100 lb capability of un-positioned (unbalanced distribution) yarns 22 as found in some prior art arrangements.

Yet another advantage of the present invention is seen in aerial installations. For example, in aerial installations it is desired to pre-strain the cable at 150 lbs to obtain the proper sag and tension over a long span. The arrangement of the present invention, using non-locked-in loose tube fiber 12 design is very effective at allowing the tight buffered fibers 12 to pull in from the ends to result in an unstrained fiber 12 whereas the typical prior art designs result in a momentary and long term fiber strain which, as discussed above, raise the opportunity for a fiber or glass break and signal loss.

As such, the design of the present invention, allows an aerial installation of a central or unstranded tube 20 without resulting in an installation which results in the initial straining of fibers 12. Environmental forces of wind and ice load will further strain all cable designs, however by having a lower initial stress as in the present invention, fibers 12 is less impacted by these incremental loads.

Thus, for example, the present invention design accomplishes such features whereby the inner diameter of loose tube 20 being approximately 10% larger than the combined diameters of the tight buffered fibers 12a and 12b which allows both of the fibers 12a and 12b to move longitudinally as needed and to the central axis during bending.

Figure 6A:
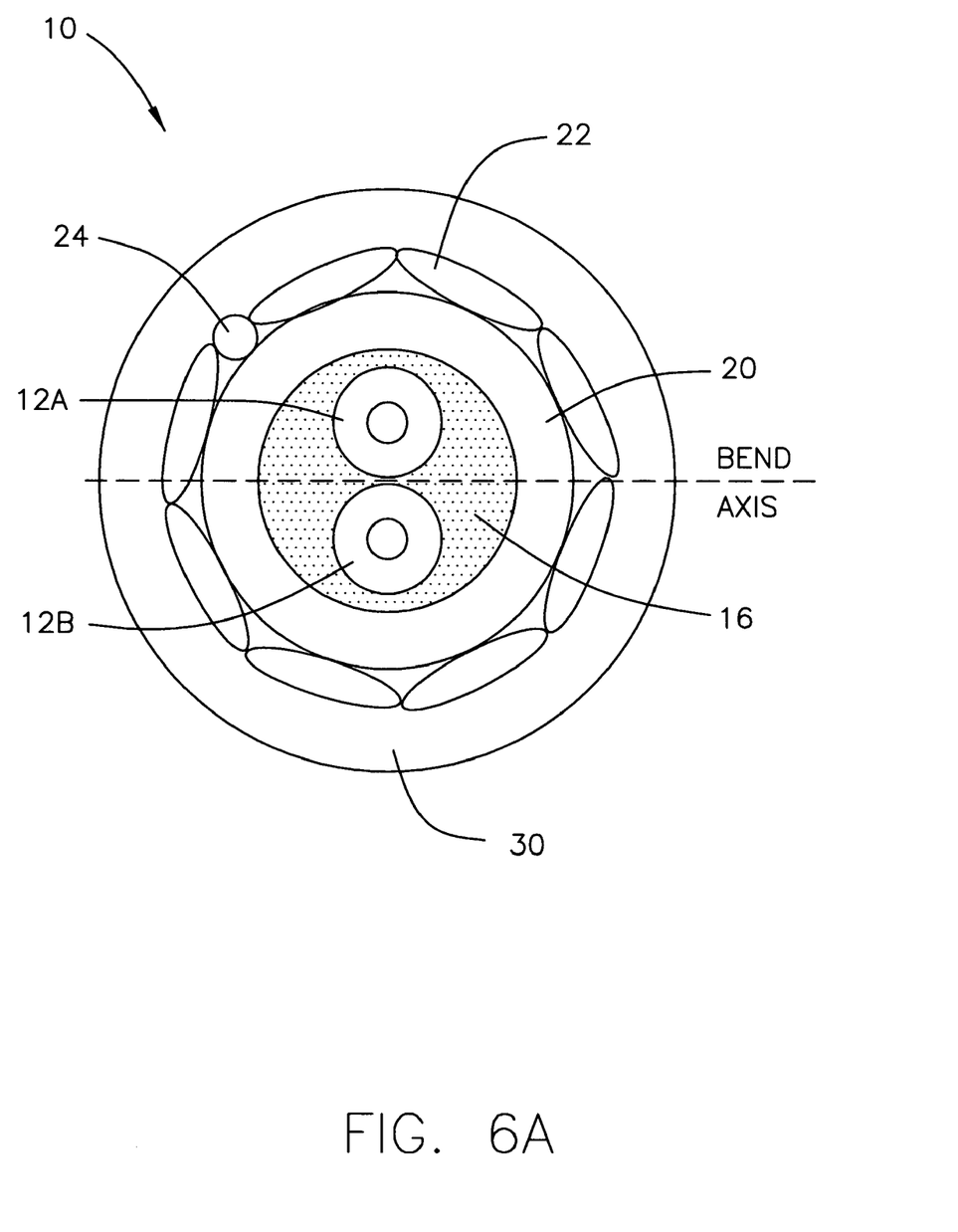
FIGS. 6A-6C illustrate a progression of bending the cable from FIG. 4, in accordance with one embodiment of the present invention.
Figure 6B:
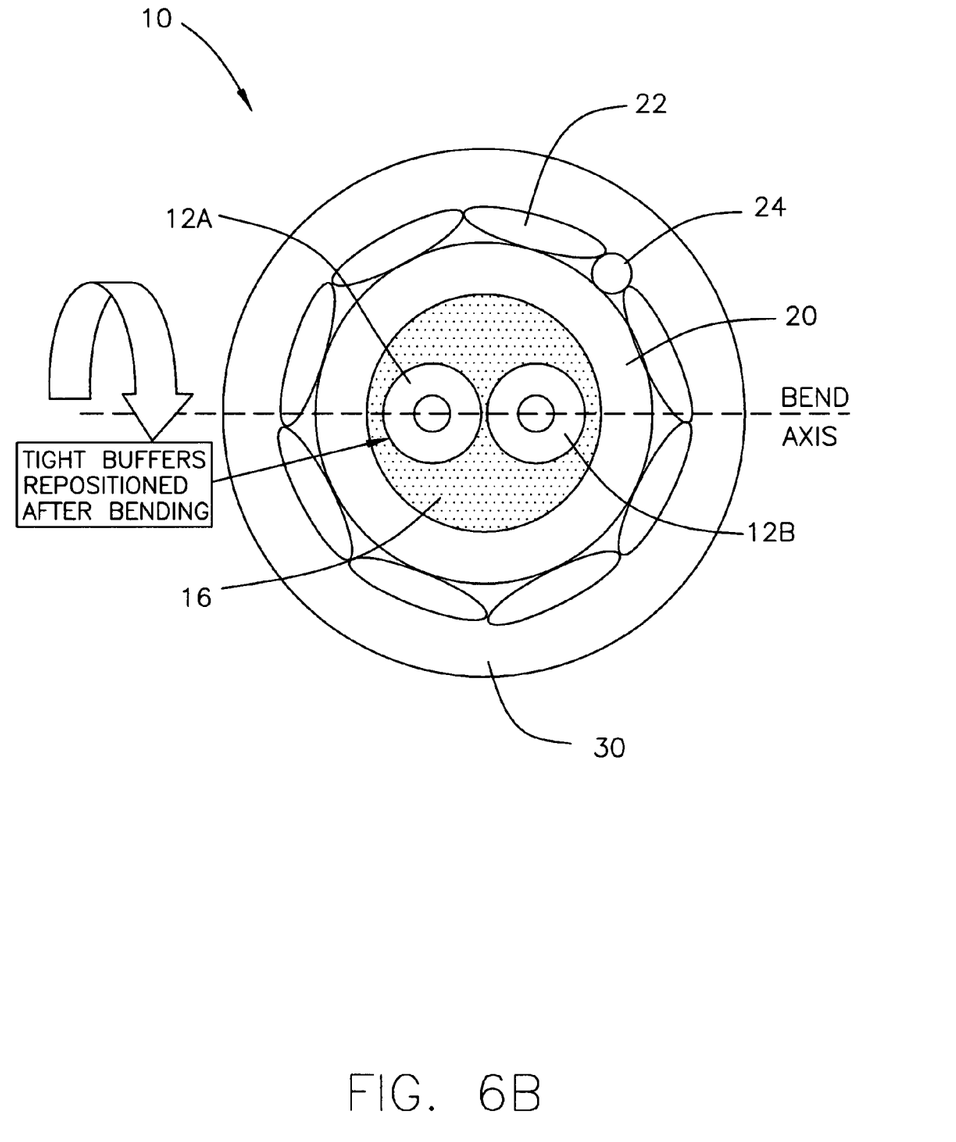
Figure 6C:
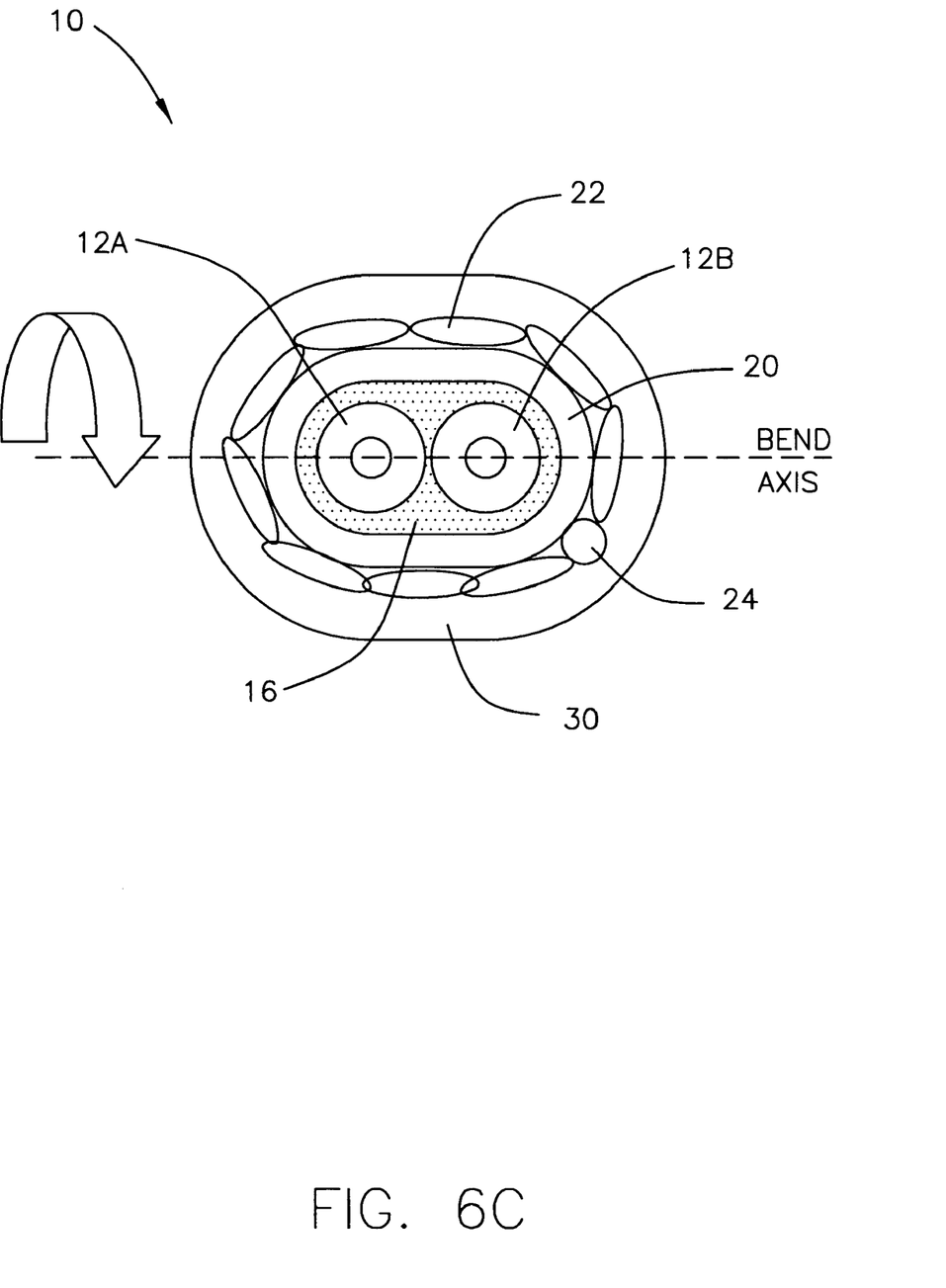

In one embodiment of the present invention FIGS. 6A through 6C show a cable 10 being bent. In a worst case scenario as shown in FIG. 6A, fibers 12a and 12b are sequentially in line with the intended bend of cable 10. In FIG. 6B, because of the loose non-attached nature of fibers 12 within loose tube 20, and because of the additional 10% larger diameter of tube 20, tight buffered fibers (TB(s)) 12a and 12b are free to move to re-arrange themselves into line with eventual bend. Thus, as shown in FIG. 6C, when cable 10 is bent, jacket 30 and loose tube 10 compress, but there is still room inside of tube 20 for tight buffer fibers 12a and 12b to move and bend without tension imbalance of the fiber within the inner diameter of tube 20 which could lead to glass strength degradation of the fibers 12.

In one embodiment of the present invention, another advantage of a cable 10 made according to the above specifications is that the loose tube arrangement described above in conjunction with the use of water swellable powder 16 facilitates or allows fibers 12 to move longitudinally through the center of loose tube 20 during installation.

Figure 7:
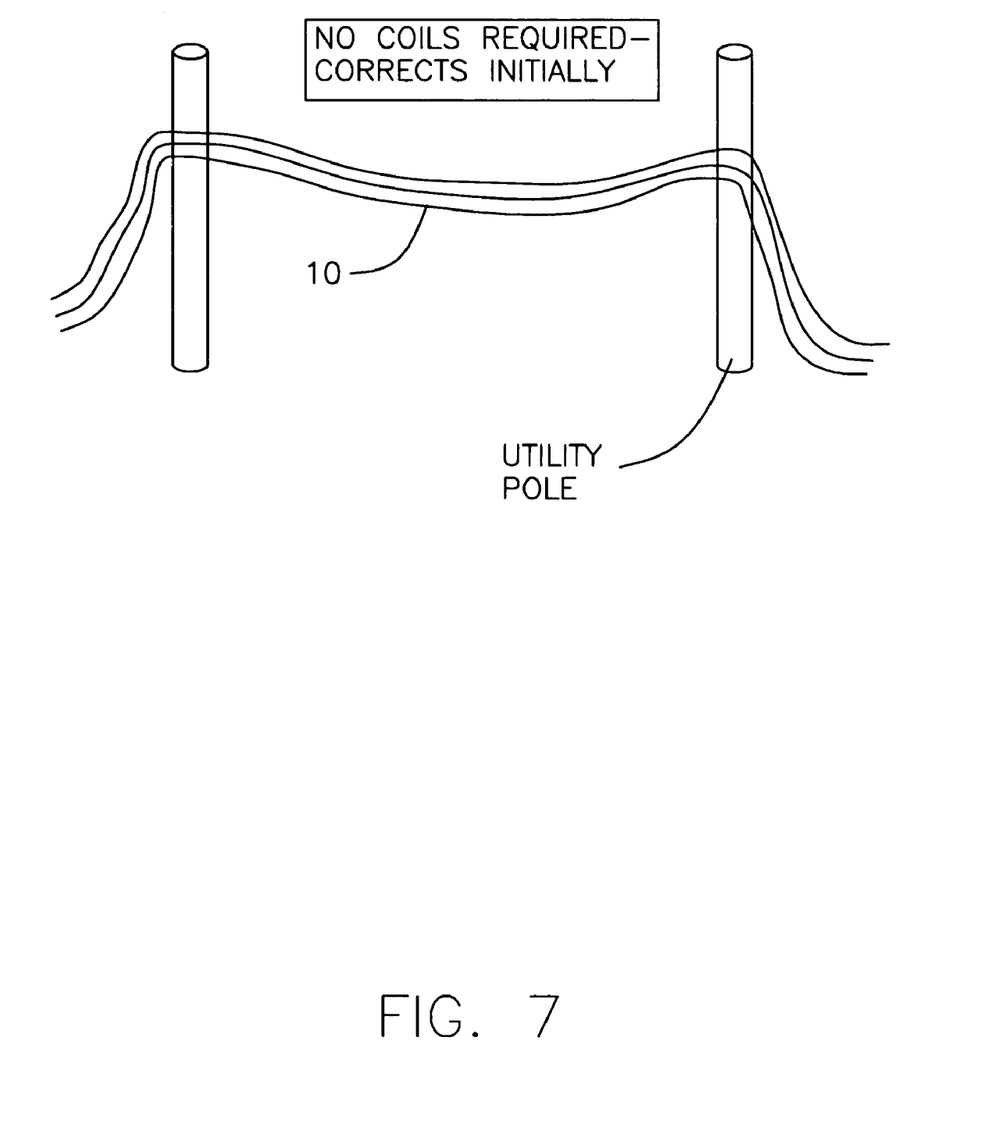
FIG. 7 illustrates a cable on a pole, in accordance with one embodiment of the present invention.

In the single tube 12 arrangement shown in FIG. 3, the fiber 12 to loose tube 20 length differential tolerance is preferably in the range of 0.9982-1.0018. In the two fiber arrangement of FIG. 4 the fiber 12 to loose tube 20 length differential tolerance is preferably in the range of 0.9997-1.0003. There is more tolerance in the single fiber 12 design because of the additional room within tube 20. By having little or no connection with tube 20, tight buffered fibers 12 are able to adjust immediately after experiencing any installation induced strain so that long re-adjustment/relaxation periods are not required. Because of this, there is no need to coil the cables 10 on the line as shown in FIG. 7.

Thus, according to the present invention, fiber 12 to loose tube 20 excess length varies by the difference between lengths if the inner diameter of tube 20 and the diameter of fiber or tight buffer 12 and the resulting bend or coil on the reel.

In the industry of fiber optic cables, a truly loose or unlocked tight buffer or loose fiber inside a cable, when rendered onto a reel, leaves the length of fiber different than the length of the cable jacket because the fiber or tight buffer is pulled to the inner diameter of the coil on the reel. The relative differences of the individual fiber or tight buffer as compared to the lengths of the cable as a whole is a ratio of circumferences of the diameter (diameter of cable/diameter of fiber)×3.1416 (PI). The relative difference in length can be found by comparing the relative circumferences of the cable versus the fiber of tight buffers inside.

For example, an arrangement of fiber 12 in a tube 20 on a 12" reel drum would result in the difference of the circumferences of PI*D (3.1416×diameter=circumference) ratio or (12 (inch drum diameter)*25.4 (conversion of inches to mm)+0.25 (mm or fiber diameter))/ (12 (inch drum diameter)*25.4 (conversion of inches to mm)+1 (mm or ½ of inner tube diameter)

or 305.05 mm/305.80 mm
=0.9975 or 0.0024 or 0.24%.

With tight buffers 12 the differential is ((12*25.4+0.9 (diameter of tight buffer)/(12*25.4+1 (mm or ½ of inner tube diameter)

or 305.70/305.80
=0.9996 or 0.0003 or 0.03%.

This is part of a process and product that allows fiber or tight buffers 12 to slip inside tube 20 thus rendering a differential length only when in a coil on a reel. At installation, an adjustment takes place with the slip inside such as over a 150 ft span may see an adjustment of the fiber of 0.24%×150 ft=0.36 ft or 4.32 inches. Thus, even in a worst case scenario where cable 10 is wound on a 12 inch reel drum, the length differential between fiber 12 and tube 20 would be 0.045 Ft or 0.54 inches. Since most actual drum diameters on reels are greater than 12 inches (resulting in less fiber 12 to tube 20 length differential), this excess length differential is usually less.

However, it can be seen how the present invention provides an advantage in this respect over the prior art. In the locked-in constructions of the gel filled or tightly wrapped aramid arrangements of the prior art flat drop or premises designs, there is an inherent differential of excess length that is locked-in during installation. This results in stress on the fibers until the fiber relaxes through the gel or aramid fibers, or otherwise simply breaks. In either case, a prolonged differential correction or fiber migration puts stress on the fiber splices or connections that may result in a faulty connections.

The present invention on the other hand, by allowing the fibers to relax immediately in the non locked-in design, set the fibers 12 in a stress free environment at the initial installation. Also the use of very low modulus filled (filled due to the flame retardant fillers) with PVC for tube 20 results in a matrix which has a low propensity to change dimension over environment variance of hot and cold temperatures.

Further this efficiency of yarn 20 placement, and the low modulus plastic (and filled plastic) for tube 20 results in a low propensity to change dimension over environment variance of hot and cold temperature, further results in a performance temperature range of between −60 to 85 C as opposed to a typical prior art range of 0 to 70 C for aramid wrapped tight buffers and −40 to 70 C for prior gel filled loose tube premises designs.

As such, cable 10 arrangement of the present invention, is sufficiently rigid to maintain its compact round structure and strong enough to survive installation stresses while simultaneously being of a construction such that little or no fiber strain is imparted to fibers 12 during installation. This reduction in strain alleviates the need for long strain adjustment periods and coiling of the cables on the utility pole, reducing overall costs. The elimination of the gel further reduces costs and fiber strain readjustment times.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber cable, said cable comprising:
    at least one tight buffer coated fiber optic element;
    a water swellable powder, disposed on said at least one tight buffer coated fiber optic element; and
    a tube surrounding said at least one tight buffer coated fiber element and said water swellable powder, wherein said tight buffer coated fiber optic element is in a loose non-coupled arrangement with respect to the inside of said tube, such that during installation, mechanical installation stresses applied to said cable and said tube are not imparted to said tight buffer coated fiber optic element therein.

2. The cable as claimed in claim 1, wherein said fiber optic element is a tight buffer coated optical fiber of approximately 900 microns in diameter.

3. The cable as claimed in claim 2, wherein said water swellable powder has a particle size of approximately up to 150 microns in diameter.

4. The cable as claimed in claim 1, wherein said water swellable powder is an SAP (Super Absorbent Polymer).

5. The cable as claimed in claim 1, further comprising a plurality of strength yarns around said tube.

6. The cable as claimed in claim 5, wherein said cable maintains approximately 6-8 strength yarns around said tube, having a individual yarn dimension thickness of substantially 0.15 to 0.4 mm, and a width of 1.7 to 2.5 mm.

7. The cable as claimed in claim, 5, wherein said strength yarns are water swellable coated fiberglass yarns.

8. The cable as claimed in claim 5 wherein said plurality of strength yarns are held against the outside diameter of said tube by an outer cable jacket.

9. The cable as claimed in claim 1, further comprising a rip cord on the outside of said tube.

10. The cable as claimed in claim 1, further comprising a tone conductor on the outside of said tube.

11. The cable as claimed in claim 1, further comprising a non-water swellable (NWS) yarn within said tube configured to assist in distributing said water swellable powder along said fiber optic element.

12. The cable as claimed in claim 2, wherein said cable maintains two tight buffer optical fibers.

13. The cable as claimed in claim 12, wherein the combined outer diameter of said two optical fibers is substantially 10% less that the inside diameter of said tube.

14. The cable as claimed in claim 12, wherein the combined area fill ratio of said two tight buffer optical fibers is substantially 40% of the internal area of said tube.

15. The cable as claimed in claim 1, wherein said tube is constructed of a low modulus FRPVC (Fire Resistant Poly Vinyl Chloride).

16. The cable as claimed in claim 15, wherein said low modulus FRPVC has a Young's modulus substantially in the range of 250-750 N/mm$^2$.

* * * * *